Patented Jan. 14, 1936

2,027,695

UNITED STATES PATENT OFFICE 2,027,695

PROCESS FOR THE PREPARATION OF ACTIVATED OR ABSORBENT CARBON OR DECOLORIZING CARBON

Andrew McCulloch, Stalybridge, and Robert Edwin Hargraves, Davyhulme, England; Winifred Elizabeth Hargraves, Burbank, Davyhulme, England, administratrix of said Robert Edwin Hargraves, deceased, assignors to Carbo-Norit-Union Verwaltungs Gesellschaft m. b. H., Frankfort-on-the-Main, Germany, a corporation of Germany No Drawing. Application December 11, 1933, Serial No. 701,940. In Great Britain December 16, 1932

5 Claims. (Cl. 252—3)

This invention relates to the preparation of activated or absorbent carbon or decolorizing carbon and has for its object to provide a simple and convenient process for producing an improved product from coal, cannel coal, lignite, peat, wood, or other suitable carbonaceous material.

Our invention comprises the chlorination of the carbonaceous material, followed by carbonization of the resulting mass and its activation.

Our invention further comprises the chlorination of the carbonaceous material while in suspension in a liquid medium, followed by carbonization and activation.

Our invention further comprises the briquetting of the chlorinated mass prior to carbonization.

Our invention further comprises the washing of the chlorinated carbonaceous material with water prior to carbonization in order to reduce the amount of inorganic matter in the carbonaceous material.

In one convenient application of the invention, the chlorination process is carried out by passing a stream of chlorine through or into intimate contact with the carbonaceous material in finely divided condition. Or the latter may be allowed to fall repeatedly through chlorine gas. Or the carbonaceous material may be in suspension in a liquid medium (such as carbon tetrachloride or other liquid which is not acted upon by chlorine) and the chlorine be diffused therethrough. If desired the chlorine may be produced in the liquid medium by a suitable reaction.

The exact temperature at which chlorination is effected should not ordinarily exceed 100° C. but higher temperatures may be used if the obtaining of a carbon of good strength is not of great importance, as in the case of decoloring carbons.

After the chlorination, we treat the chlorinated mass to remove therefrom the large quantities of hydrogen chloride which have been produced during the reaction and which are retained by the carbonaceous material. This treatment also effects the removal of any free chlorine, and in the case of chlorination in suspension in a liquid medium, of the retained liquid. Such removal may be effected by placing the chlorinated carbonaceous material under a vacuum, by heating under partial vacuum, or at normal pressures, to a suitable temperature or by washing to the required extent with water. In the preparation of certain products, washing of the chlorinated mass may be effected to reduce the inorganic matter in the carbonaceous material, represented as ash.

The chlorinated mass, when moulded under pressure, after carbonization and activation, yields an excellent granular absorption carbon, resistant to pulverization. A slow activation has proved particularly advantageous for obtaining good hard carbon.

Certain advantages arise when the chlorination is not effected in a liquid medium. For example, the amount of chlorine used is less. There is of course also the saving of carbon tetrachloride or other liquid medium.

In many cases in the chlorination, a substantial generation of heat occurs. It has been found advantageous to control the temperature of chlorination by cooling the reaction material. This may be effected by applying a cooling medium to the chlorination apparatus, such as by water jacketing.

The activation can be effected in any desired or usual manner. Thus it can be effected by steaming or by means of chemicals. It is especially advantageous to keep the temperature of activation as low as possible as the resultant product has more valuable properties.

As an example of our process, using an average bituminous coal, 100 parts of air-dried coal gave, on chlorination in suspension in carbon tetrachloride, and after recovery and heating to 80° C. under a vacuum of about 15 m. m. of mercury, 169 parts of chlorinated coal. This after briquetting and carbonizing at 900° C. gave 76 parts of absorbent carbon which on activation had a comparative absorption value for carbon tetrachloride vapor of 120 per cent of its own weight.

As a further example, 200 kgs. of gas coal, which contains about 38% volatile constituents, are finely ground in a tube mill. Thereupon a stream of chlorine gas is introduced into the mill which chlorine is vigorously absorbed by the carbon. At the same time there is an increase in temperature, which by suitable cooling-water trickling over the tube mill is kept at a maximum of 60° C. The hydrochloric acid gas liberated in the chlorine reaction is conveyed away from the mill and collected in one of the usual condensation devices. After about 250 kgs. chlorine have been introduced, the reaction is ended.

The resulting dust-like product is then moulded under pressure, e. g. in a tablet-forming machine. The moulded articles are then carbonized by slow heating to about 850° C. In this way about 140 kgs. of a granular carbon are obtained, which carbon already shows a noticeable activity as compared with the initial material. This product is then further activated in known manner with steam, the activating temperature not substantially exceeding 850° C. If this activation is carried to such a point as to involve about 50% loss by burning (yield about 70 kgs.), a highly active granular carbon is obtained which for carbon tetrachloride has an absorption capacity of 125%.

What we claim is:

1. A process for the production of active carbon of great strength and activity from carbonaceous initial materials containing chlorinatable constituents, which comprises preliminarily subjecting the material to chlorination treatment while suspended in an organic liquid inert to chlorine while preventing the temperature from rising to a point materially in excess of 100° C., thereafter compressing the so-treated material into briquets, and carbonizing and activating the briquetted material.

2. Process as defined in claim 1, in which the material after chlorination treatment is freed from organic liquid, chlorine and at least a part of the reaction products before being briquetted.

3. Process as defined in claim 1, in which organic liquid, chlorine and at least a part of the reaction products are removed from the chlorinated material, prior to briquetting, by a treatment involving washing the material with water.

4. Process as defined in claim 1, in which the organic liquid is carbon tetrachloride.

5. Process as defined in claim 1, in which activation is effected by means of gases or vapors.

ANDREW McCULLOCH.
ROBERT EDWIN HARGRAVES.